Patented Aug. 17, 1943

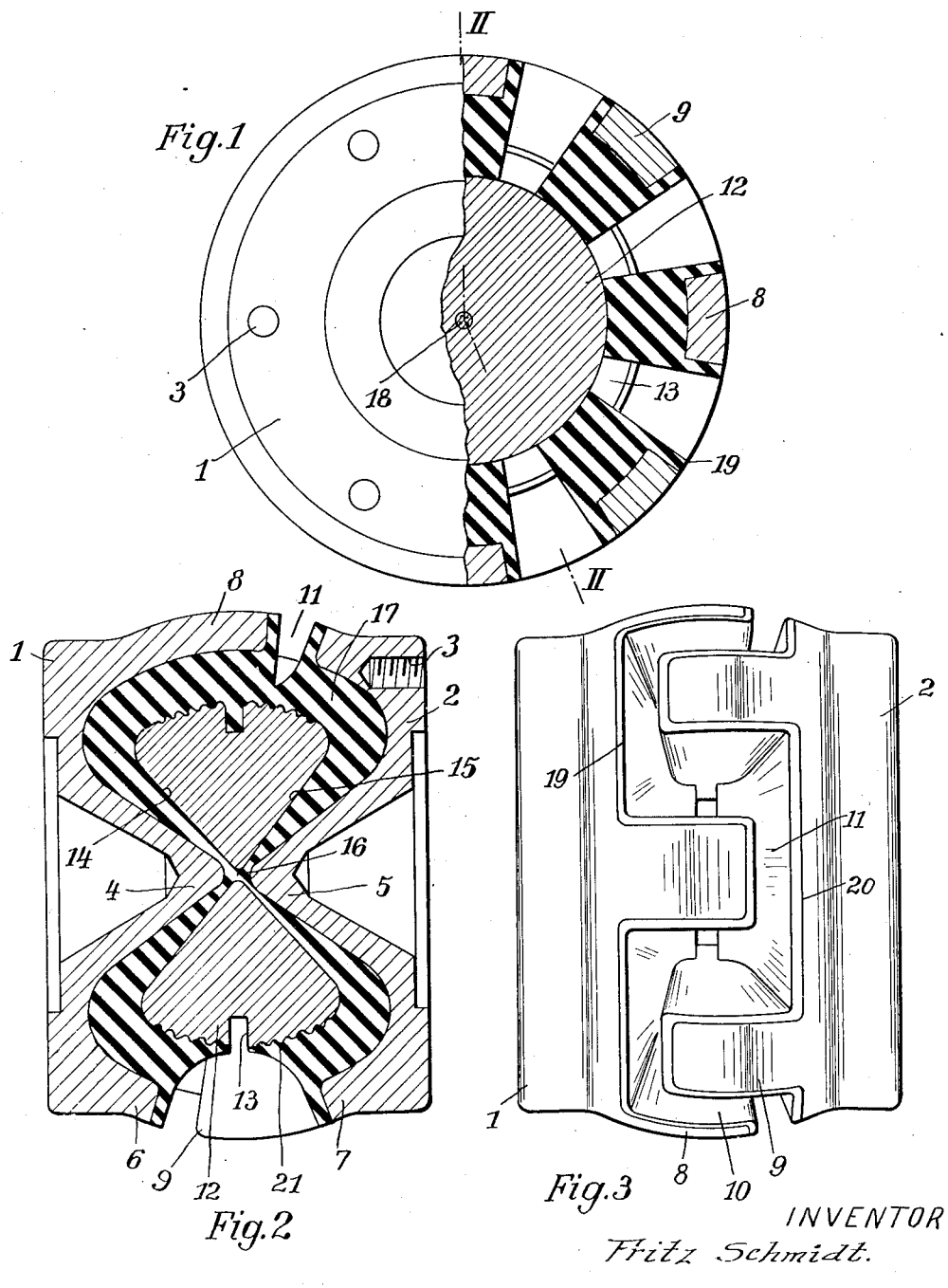

2,326,976

UNITED STATES PATENT OFFICE 2,326,976

ELASTIC COUPLING

Fritz Schmidt, Hamburg-Harburg, Germany; vested in the Alien Property Custodian

Application May 28, 1941, Serial No. 395,525
In Germany November 22, 1940

14 Claims. (Cl. 64—14)

The invention relates generally to shaft couplings and it has particular relation to flexible couplings.

Elastic couplings which are intended to transmit a large torque and whose associated shafts may be deflected relatively to one another, must be provided with a correspondingly large centering device which in most cases consists of a central spherical journal or ball pivot that is guided in a cylinder. With large couplings this centering device requires a large space, in depth as well as width, which is unavailable for housing the elastic means connecting the coupling disks. The dimensions of such couplings consequently become undesirably large, and this applies particularly to the circumference of the couplings.

One object of the invention is to provide an improved flexible coupling of small dimensions which is capable of transmitting large torque loads.

Another object of the invention is to provide an improved flexible coupling which has a novel, inexpensive and highly efficient centering means.

And, in general, it is an object of the invention to provide an improved rubber coupling of small dimensions which is capable of transmitting torque loads efficiently even though the coupled shafts are deflected, one with respect to the other.

Other objects of the invention will become apparent from the following specification, from the drawing relating thereto, and from the claims hereinafter set forth.

The drawing illustrates the invention by means of one example of construction, and Fig. 1 namely shows the coupling, partly in section, looking at one coupling disk;

Fig. 2 shows a section along line 2—2 of Fig. 1; and

Fig. 3 shows a side view of the coupling.

According to Figs. 1 to 3, two coupling disks 1 and 2 are provided with threaded attachment holes 3 for securing them to the two shafts respectively. In their center the coupling disks 1 and 2 carry the conical protrusions 4 and 5, while they are provided at their periphery with projections 6 and 7 of hollow spherical form, out of which are cut the teeth 8 and 9, adapted to engage with one another but initially having lateral clearance 10. A space 11 is provided at the end faces of the teeth for the deflection of the shafts relatively to one another. There is disposed between the cones 4 and 5 of the coupling disks 1 and 2 a spherical zone shaped element 12, which may be made of any metal or of an artificial substance or of hard rubber. This element is provided with a cut-out 13 at its periphery, which serves to set it in position in the vulcanizing mold. The spherical zone element 12 has conical recesses 14 and 15, which respectively receive the cones 4 and 5 of the coupling disks 1 and 2 and the outer surface of the element is spherical, although it may be cylindrical in certain cases. The envelope lines of all cones intersect at the center point 16 of the coupling, which at the same time forms the center point for the outer surface of the spherical zone element and for the inner and outer surfaces of the housing portions 6 and 7. A flexible rubber element 17 serves as the elastic means that fills the entire inner space of the coupling, and in the example that is illustrated it passes through the hole 18 in the center of the spherical zone element 12. The rubber element moreover covers the entire contour of the teeth 8 and 9, as is indicated in Fig. 3 by the numeral 19, as well as the edges 20 of the housing portions 6 and 7 situated between the teeth. In order to increase the gripping area of the spherical zone element 12, this element is provided at its periphery with grooves or with any kind of projections 21. It will be understood that the rubber is vulcanized to the surfaces with which it contacts.

It will be understood that the invention provides an elastic coupling for shafts which may be deflected relatively to one another, wherein a shaft centering device is formed by the conical points or tapers of the coupling disks and by an element of cylindrical form or having the form of a spherical zone, which is provided with conical recesses and which is disposed inside the rubber mass. This produces a coupling which is adapted to the transmission of large torques, and which is of extraordinary short constructional length in its longitudinal direction, in that the spherical zone shaped element which effects the centering action in cooperation with the conical points, unlike the known spherical journals or ball pivots, requires no additional space for itself, and in spite of this it permits sufficient angular deflection of the shafts, whereby the conical form of construction of the coupling disks makes a sufficient gripping area available for the rubber element.

Moreover, the envelope lines of all conical surfaces intersect at the center point of the coupling, in order that the centerlines of the shafts may meet or merge perfectly even when the shafts are deflected.

A further advantage in the design of the invention consists in that the cones of the coupling disks and the recesses 14 and 15 of the spherical zone element have different degrees of steepness. This produces uniform stressing of the rubber mass disposed between the conical points and the recesses, since this mass, because of the steeper inclination of the hollow conical surface of the spherical zone element, increases in thickness toward the periphery of the coupling, so that when the shafts are deflected the greater displacement of the metal parts relatively to one another is accommodated by the longer rubber fibers.

The invention moreover provides for the complete enclosure of the spherical zone element inside the rubber mass. This results in full utilization of its surface for gripping the rubber element that transmits the torque. The load per unit of area upon it is moveover relatively low, so that it may in accordance with the invention be made of hard rubber, artificial substances, or aluminum, and thus have a favorable influence upon the weight of the whole coupling.

The great gripping surface that is obtained by the spherical zone element is in accordance with the invention utilized for the coupling disks in that extensions that enlarge the coupling disks surround the spherical zone element in the manner of a housing, being constructed in the form of a hollow sphere. This also produces as large as possible a gripping surface for the coupling disks, while avoiding over-stressing of the relatively small rubber elements, and avoiding over-stressing of the individual fibers of the rubber by means of such coupling disks in combination with the spherical zone element. The coupling is at the same time well protected against external influences by the housing-like form of construction.

Perfect running of the shafts at any angular position relatively to one another, and appropriate stressing of the rubber element, is obtained with this form of construction in accordance with the invention in that the radii of the spherical zone element and of the coupling disk housing, and the envelope lines of the conical surfaces intersect at the center point 16 of the coupling.

Also according to the invention the teeth that engage with one another are formed on both halves of the coupling housing, and the rubber element grips these teeth besides gripping the large gripping surfaces. By this means the torque may be increased at will, after a smooth start, without the coupling becoming unelastic, and without having a coupling of undesirably large dimensions.

In order to fully achieve the objective of a small constructional depth and length, as well as the objective of the transmission of a large torque, a further valuable form of construction in accordance with the invention is that the rubber element completely fills the space between the coupling disks up to the cut-outs between the teeth, and if need be it completely fills the space between the conical points, whereby any metallic contact of the parts is avoided and no lubricant is required.

The coupling may be utilized at any place where large torques are to be transmitted to a shaft that may be deflected; it is particularly adapted for application to cardan shafts for automobiles.

What is claimed is:

1. A flexible coupling for shafts comprising a pair of separate, substantially conically shaped coupling discs adapted to be connected respectively to a pair of shafts and having their smaller ends adjacent, a flexible rubber mass between the discs and bonded thereto, and a ring of material harder than the rubber disposed in encircling relation to the outer conical sides of the discs, said discs being movable relative to each other to allow such relative deflection of the discs that the axis of one may be deflected or disposed at an angle with respect to the other.

2. A flexible coupling for shafts comprising a pair of separate, substantially conically shaped coupling discs adapted to be connected respectively to a pair of shafts and having their smaller ends adjacent, a flexible rubber mass between the discs and bonded thereto, and a ring of material harder than the rubber disposed in encircling relation to the outer conical sides of the discs, said ring having its end faces formed with substantially conical recesses respectively, re-receiving the adjacent conical ends of the discs, said discs being movable relative to each other to allow such relative deflection of the discs that the axis of one may be deflected or disposed at an angle with respect to the other.

3. A flexible coupling for shafts comprising a pair of separate, substantially conically shaped coupling discs adapted to be connected respectively to a pair of shafts and having their smaller ends adjacent, a flexible rubber mass between the discs and bonded thereto, and a ring of material harder than the rubber disposed in encircling relation to the outer conical sides of the discs, said ring having its end faces formed with substantially conical recesses receiving the adjacent conical ends of the discs and the sides of such recesses diverging outwardly with respect to the conical sides of the discs so that the rubber mass increases in thickness outwardly from the center of the coupling.

4. A flexible coupling for shafts comprising a pair of separate, substantially conically shaped coupling discs adapted to be connected respectively to a pair of shafts and having their smaller ends adjacent, a flexible rubber mass between the discs and bonded thereto, and a ring of material harder than the rubber disposed in encircling relation to the outer conical sides of the discs, said ring having its end faces formed with substantially conical recesses respectively receiving the adjacent conical ends of the discs, with the envelope lines of the conical surfaces intersecting at the center of the coupling.

5. A flexible coupling for shafts comprising a pair of separate, substantially conically shaped coupling discs adapted to be connected respectively to a pair of shafts and having their smaller ends adjacent, a flexible rubber mass between the discs and bonded thereto, and a ring of material harder than the rubber disposed in encircling relation to the outer conical sides of the discs and being entirely enclosed by the rubber mass.

6. A flexible coupling for shafts comprising a pair of separate, substantially conically shaped coupling discs adapted to be connected respectively to a pair of shafts and having their smaller ends adjacent, a flexible rubber mass between the discs and bonded thereto, and a ring of material harder than the rubber disposed in encircling relation to the outer conical sides of the discs, said ring having its end faces formed with substantially conical recesses respectively receiving the adjacent conical ends of the discs and the center of the ring having rubber extending therethrough.

7. A flexible coupling for shafts comprising a pair of separate, substantially conically shaped coupling discs adapted to be connected respectively to a pair of shafts and having their smaller ends adjacent, a circular element disposed between the discs and having opposite ends provided with recesses of substantially conical shape and which receive the conical ends of the discs, and rubber between the discs and member and bonded thereto.

8. A flexible coupling for shafts comprising a pair of separate, substantially conically shaped coupling discs adapted to be connected respectively to a pair of shafts and having their smaller ends adjacent, a circular element disposed between the discs and having opposite ends provided with recesses of substantially conical shape and which receive the conical ends of the discs, and rubber between and bonded to the discs and enclosing the circular member.

9. A flexible coupling for shafts comprising a pair of separate discs adapted to be connected respectively to a pair of shafts and respectively having central substantially conical portions disposed with their smaller ends adjacent, the discs outwardly of the conical portions being reversely turned to provide housing walls surrounding the conical walls, teeth on the reversely turned outer edge portions of the discs and disposed alternately on the latter so as to engage upon relative turning of the discs, and a rubber mass between the discs and bonded thereto.

10. A flexible coupling for shafts comprising a pair of separate discs adapted to be connected respectively to a pair of shafts and respectively, having central, substantially conical portions disposed with their smaller ends adjacent, the discs outwardly of the conical portions being reversely turned to provide housing walls surrounding the conical walls, teeth on the reversely turned outer edge portions of the discs and disposed alternately on the latter so as to engage upon relative turning of the discs; a circular member between the discs and concentric to the axis of the coupling, and rubber between and bonded to the discs and enclosing the circular member.

11. A flexible coupling for shafts comprising a pair of separate discs adapted to be connected respectively to a pair of shafts and respectively, having central, substantially conical portions disposed with their smaller ends adjacent, the discs outwardly of the conical portions being reversely turned to provide housing walls surrounding the conical walls, teeth on the reversely turned outer edge portions of the discs and disposed alternately on the latter so as to engage upon relative turning of the discs, a circular member between the discs and having substantially conical recesses receiving the conical ends of the discs, and rubber between the discs and said member and bonded thereto.

12. A flexible coupling for shafts comprising a pair of separate discs adapted to be connected respectively to a pair of shafts and respectively, having central substantially conical portions disposed with their smaller ends adjacent, the discs outwardly of the conical portions being reversely turned to provide housing walls surrounding the conical walls, teeth on the reversely turned outer edge portions of the discs and disposed alternately on the latter so as to engage upon relative turning of the discs, a circular member between the discs and concentric to the axis of the coupling, and rubber between and bonded to the discs and enclosing the circular member, said rubber being also disposed in covering relation to the radial sides of the teeth.

13. A flexible coupling comprising a pair of separate discs adapted to be connected respectively to a pair of shafts and having central substantially conical portions disposed with their smaller ends adjacent, the discs outwardly of the conical portions being reversely turned to provide outer housing walls projecting towards each other, a circular member disposed between the discs and concentrically thereto and having substantially conical recesses in their end faces respectively receiving the ends of the discs but being separated from the disc surfaces, and a rubber mass between and substantially filling the spaces between the discs and being bonded thereto.

14. A flexible coupling comprising a pair of separate discs adapted to be connected respectively to a pair of shafts and having central substantially conical portions disposed with their smaller ends adjacent, the discs outwardly of the conical portions being reversely turned to provide outer housing walls projecting towards each other, alternating teeth on the free edges of the reversely turned housing walls and disposed in circumferentially and axially spaced relation so that the discs may turn relatively limited amounts before the teeth engage, a circular member disposed between the discs and concentrically thereto and having substantially conical recesses in their end faces respectively receiving the conical ends of the discs, the cone angles of the recesses and discs being such that the space between the conical surfaces at each side of the member diverges outwardly, and a rubber mass substantially filling the spaces between the discs and around the member and thinly covering the radial faces of the teeth, and being bonded thereto.

FRITZ SCHMIDT.